Patented Mar. 29, 1932

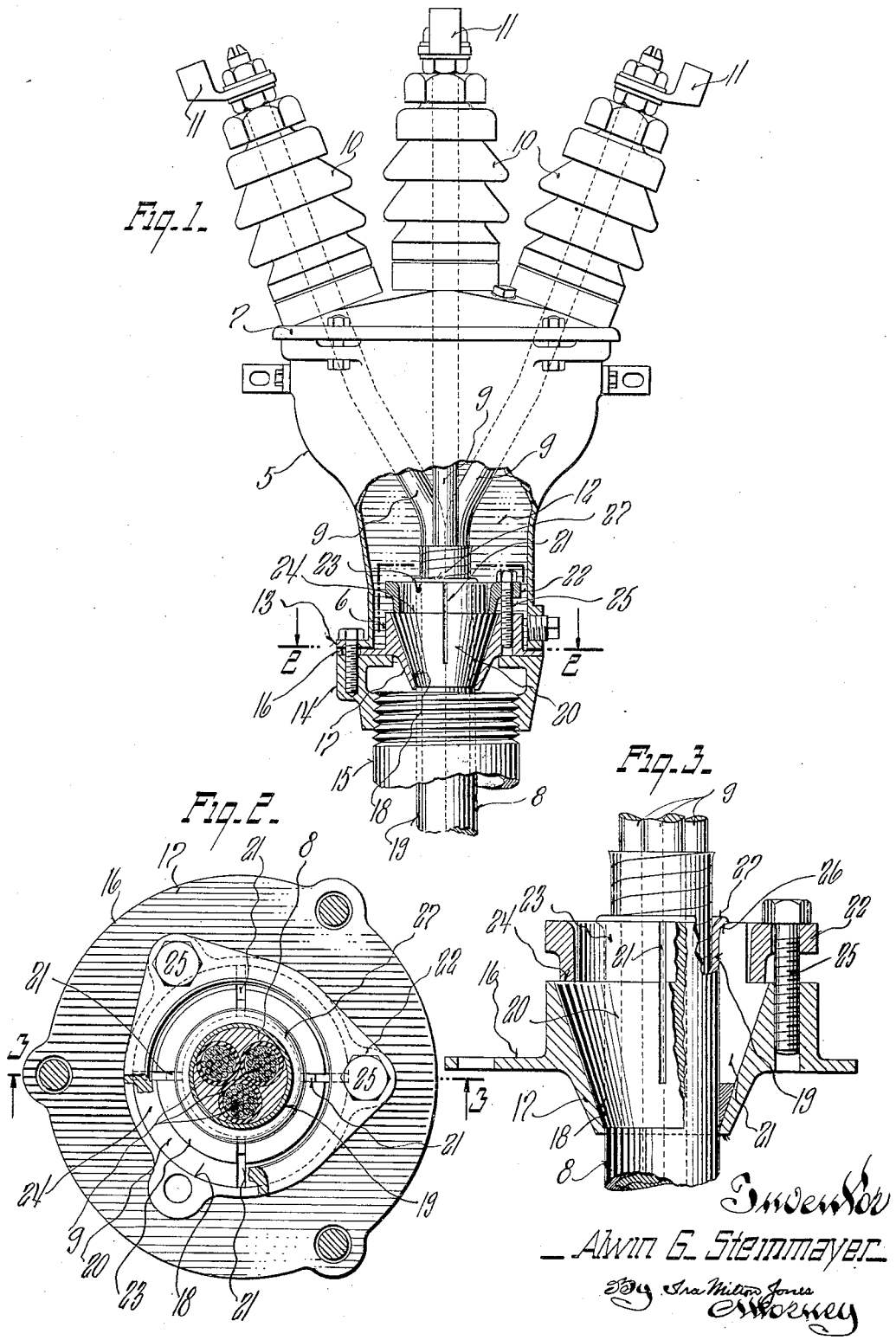

1,851,736

UNITED STATES PATENT OFFICE

ALWIN G. STEINMAYER, OF MILWAUKEE, WISCONSIN, ASSIGNOR, BY MESNE ASSIGNMENTS, TO LINE MATERIAL COMPANY, A CORPORATION OF DELAWARE

POT HEAD

Application filed January 7, 1929. Serial No. 330,956.

This invention relates to certain new and useful improvements in pot heads and contemplates as an object the provision of means for hermetically sealing the inlet of the pot head through which the cable enters.

Another object of this invention resides in the provision of a stuffing box or packing for the inlet of a pot head, which is formed of metal to provide means for grounding the cable sheath to prevent electrostatic discharges.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a view, partly in elevation and partly in section, of a pot head embodying my invention;

Figure 2 is a cross sectional view taken through Figure 1 on the plane of the line 2—2; and Figure 3 is an enlarged, fragmentary detail view illustrating the packing or seal which surrounds the cable sheath at its point of entrance to the pot head, parts thereof being in section and parts in elevation.

Referring now more particularly to the accompanying drawing, in which like numerals designate like parts throughout the several views, 5 represents the casing or body of a pot head of conventional design having an inlet 6 at its lower end and having a cover 7 closing its open top. A cable 8 extends through the inlet opening 6 and has its outer covering stripped to bare its several conductors 9 which are fanned outwardly through insultor bushings 10 secured in the cover, to be connected at their outer ends with terminal members 11. As is customary in devices of this nature, the interior of the pot head is filled with a suitable moisture proof and insulating compound 12.

A flange 13 extends from the lower end of the casing 5 to provide means for connecting it with a collar 14 threaded on the upper end of a conduit or pipe 15 which encloses the cable 8 and provides a suitable support for the entire assembly. Impinged between the flange 13 and the upper face of the collar 14 is the flange 16 of a sleeve member 17 whose bore 18 is tapered to receive a correspondingly shaped bushing member 20.

The bushing member 20 snugly engages the lead sheath 19 of the cable and is preferably formed of a substantially soft metal such as lead or the like. A plurality of longitudinal slots 21 extend downwardly from the top of the bushing member 20 and terminate a short distance from the bottom thereof to substantially divide the bushing member into a plurality of segments which are adapted to be urged toward each other to securely clamp the lead sheath 19 of the cable upon being forced into the tapered bore 18 by a pressure applying member or ring 22.

The ring 22 surrounds the upper reduced portion 23 of the bushing member 20 and has its lower periphery engaged with a shoulder 24 formed by the reduced diameter 23. A plurality of cap screws 25 or the like passed through aperatures in the ring member 22 and threaded in the sleeve 17 provide means for forcing the bushing member 20 into the tapered bore 18, to securely grip the sheath of the cable; but inasmuch as the longitudinal slots 21 do not extend throughout the entire length of the bushing member it will be evident that a hermetic seal is provided at the inlet of the casing 5.

The upper end of the bore extending through the bushing member 20 is preferably rounded, as at 26, and the end of the lead sheath 19 is pressed thereover, as at 27, to thus assist in preventing longitudinal movement of the cable with respect to the bushing.

From the foregoing description, taken in connection with the accompanying drawing, it will be readily apparent to those skilled in the art to which an invention of the character described appertains, that I provide a novel means for anchoring or securing a cable within the entrance of a pot head which hermetically seals the entrance and provides means for preventing electrostatic discharges by grounding the cable.

What I claim as my invention is:

1. In a pot head having an inlet through which a cable extends, a member secured in the inlet and having a tapered bore, a bushing member of deformable metal mounted in the tapered bore and having longitudinal slots substantially dividing it into segments, a ring member surrounding the upper ends of the several segments, and means for drawing the ring member toward said first mentioned member to force the bushing into the tapered bore and its several segments toward each other to securely clamp the cable extended therethrough and hermetically seal the inlet of the pot head.

2. In a pot head having an inlet through which a sheathed cable extends, a member positioned at the inlet and having a tapered bore, a bushing member formed of relatively soft metal mounted in the tapered bore and surrounding the cable, means for forcing the bushing member into the tapered bore to securely clamp and anchor the cable and hermetically seal the inlet of the pot head, and means extended from the bushing member and forming a substantially yieldable seat for the cable sheath which is peened thereover.

3. In combination with a pot head having a tapered bore in one wall to provide an inlet adapted to receive a cable, a bushing member of deformable metal mounted in the tapered bore and surrounding the cable, said bushing member having longitudinal slots extended from one end thereof and terminating short of its opposite end to divide the major portion of the bushing into a plurality of segments, and means for forcing the bushing into the tapered bore with its unslotted portion innermost, the portion of the bushing divided into segments securely gripping the cable to anchor the same in the pot head inlet and the unslotted portion of the bushing cooperating with the walls of the cable and the tapered bore to hermetically seal the inlet to the pot head.

4. In combination with a pot head having a tapered bore in one wall to provide an inlet adapted to receive a cable, a bushing member of deformable metal mounted in the tapered bore and surrounding the cable, the wall of the bushing member being substantially wedge shaped in cross section and the bushing member having a plurality of longitudinal slots extending inwardly from its end of greater diameter and terminating short of its opposite end to divide the major portion thereof into a plurality of segments, a ring member surrounding the several segments, and means for drawing the ring member toward said first mentioned member to force the bushing member into the tapered bore, the several segments of the bushing securely gripping the cable and anchoring the same in the tapered bore and its unslotted portion being wedged between the walls of the tapered bore and the cable to hermetically seal the inlet to the pot head.

5. In combination with a pot head having a tapered bore in one wall to provide an inlet adapted to receive a cable, a bushing of deformable metal mounted in the tapered bore and surrounding the cable, said bushing having a plurality of longitudinal slots dividing it into segments, each slot terminating short of one end of the bushing whereby adjacent segments are connected, and means for forcing the bushing into the tapered bore so that segments thereof securely grip the cable and anchor the same in the pot head inlet and the metal of the bushing is wedged between the walls of the tapered bore and the cable to hermetically seal the inlet to the cable.

In testimony whereof I have hereunto affixed my signature.

ALWIN G. STEINMAYER.